(12) United States Patent
Franco et al.

(10) Patent No.: US 7,792,964 B2
(45) Date of Patent: Sep. 7, 2010

(54) RUNNING INTERNET APPLICATIONS WITH LOW RIGHTS

(75) Inventors: Roberto A. Franco, Seattle, WA (US); Anantha P Ganjam, Sammamish, WA (US); John G. Bedworth, Redmond, WA (US); Peter T. Brundrett, Seattle, WA (US); Roland K Tokumi, Issaquah, WA (US); Jeremiah S. Epling, Kirkland, WA (US); Daniel Sie, Bellevue, WA (US); Jianrong Gu, Bellevue, WA (US); Marc Silbey, Seattle, WA (US); Vidya Nallathimmayyagari, Redmond, WA (US); Bogdan Tepordei, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 771 days.

(21) Appl. No.: 11/262,316

(22) Filed: Oct. 28, 2005

(65) Prior Publication Data
US 2006/0277311 A1    Dec. 7, 2006

Related U.S. Application Data

(63) Continuation-in-part of application No. 11/145,530, filed on Jun. 3, 2005.

(51) Int. Cl.
*G06F 15/173* (2006.01)
*G06F 15/16* (2006.01)

(52) U.S. Cl. ...................... 709/225; 709/229
(58) Field of Classification Search ............ 709/225, 709/229
See application file for complete search history.

(56) References Cited

U.S. PATENT DOCUMENTS

| 5,892,904 | A | 4/1999 | Atkinson et al. |
|---|---|---|---|
| 5,949,882 | A | 9/1999 | Angelo |
| 5,974,549 | A | 10/1999 | Golan |
| 6,279,111 | B1 | 8/2001 | Jensenworth et al. |
| 6,321,334 | B1 * | 11/2001 | Jerger et al. ............ 726/1 |
| 6,430,561 | B1 * | 8/2002 | Austel et al. ............ 707/9 |
| 6,609,198 | B1 * | 8/2003 | Wood et al. ............ 713/155 |
| 6,789,170 | B1 * | 9/2004 | Jacobs et al. ............ 711/133 |
| 2002/0019941 | A1 * | 2/2002 | Chan et al. ............ 713/185 |

(Continued)

FOREIGN PATENT DOCUMENTS

HK    1119321    2/2009

OTHER PUBLICATIONS

Moshe Zviran and Chanan Glezer, Toward Generating a Data Integrit Standard, 2000, Data & Knowledge Engineering 32, pp. 291-313.*

(Continued)

*Primary Examiner*—Joon H Hwang
*Assistant Examiner*—Chau D Le

(57) ABSTRACT

In various embodiments, applications that are configured to interact with the Internet in some way are executed in a restricted process with a reduced privilege level that can prohibit the application from accessing portions of an associated computing device. For example, in some embodiments, the restricted process can prohibit applications from read and write access to portions of a system's computer-readable media, such as the hard disk, that contains administrative data and settings information and user data and settings. In these embodiments, a special portion of the disk, termed a "containment zone", is designated and used by applications in this restricted process.

10 Claims, 6 Drawing Sheets

U.S. PATENT DOCUMENTS

2002/0184520 A1    12/2002  Bush et al.
2004/0006706 A1     1/2004  Erlingsson
2004/0103203 A1*    5/2004  Nichols et al. ............. 709/229
2004/0199763 A1*   10/2004  Freund ....................... 713/154
2005/0149726 A1*    7/2005  Joshi et al. ................. 713/164

OTHER PUBLICATIONS

Jesper Johansson and Eugene Schultz, Dealing with Contextual Vulnerabilities in Code: Distinguishing between Solutions and Pseudosolutions, 2003, Computers & Security, vol. 22, No. 2, pp. 152-159.*

"Non-Final Office Action", U.S. Appl. No. 11/145,530, (May 26, 2010),37 pages.

"Final OFfice Action", U.S. Appl. No. 11/145,530, (Jan. 6, 2010),28 pages.

"Non Final Office Action", U.S. Appl. No. 11/145,530, (Jul. 17, 2009),24 pages.

"PCT Search Report and Written Opinion", Application No. PCT/US06/18752, (Aug. 31, 2007),7 pages.

* cited by examiner

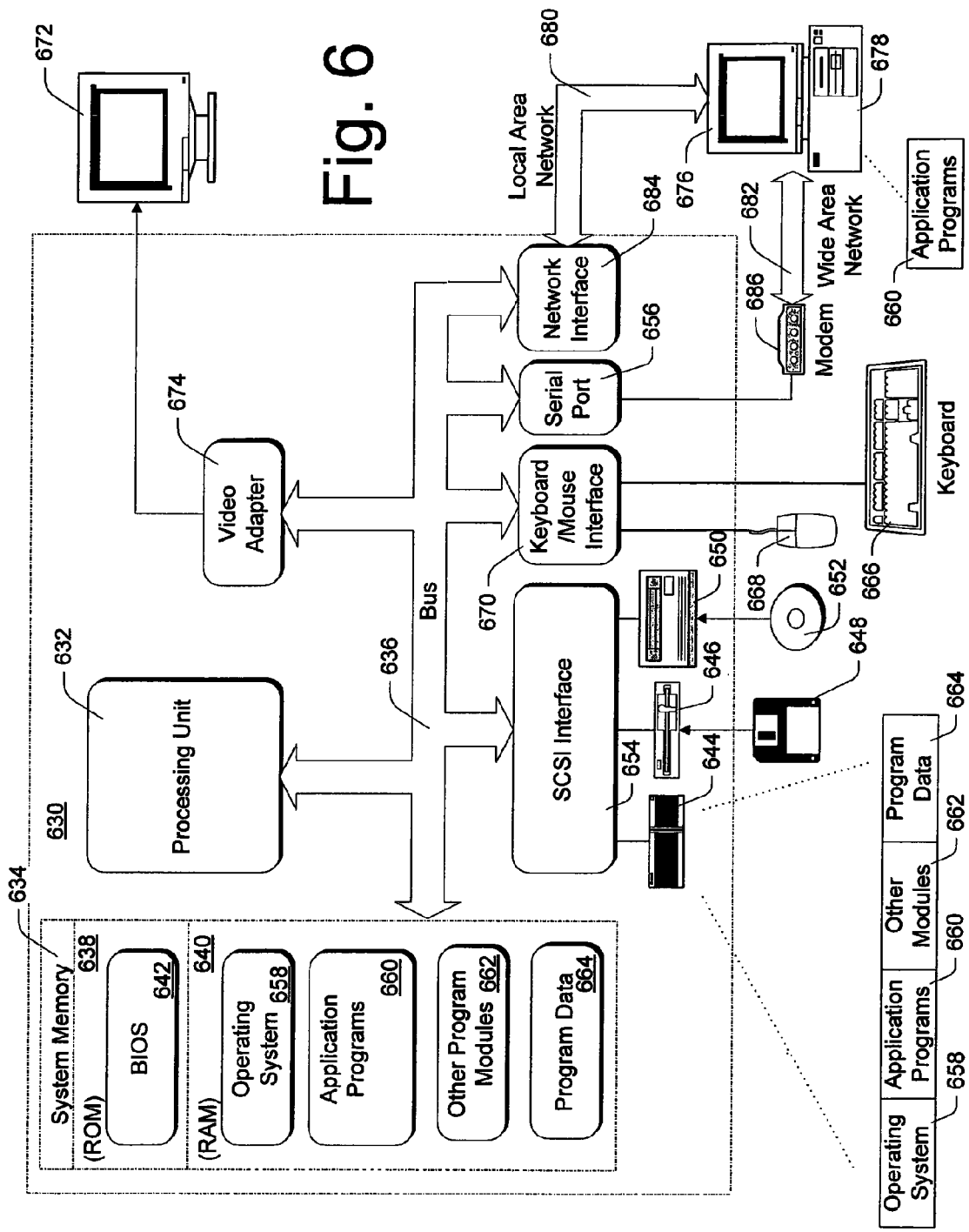

RUNNING INTERNET APPLICATIONS WITH LOW RIGHTS

RELATED APPLICATION

This application is a continuation-in-part of and claims priority to U.S. patent application Ser. No. 11/145,530, filed on Jun. 3, 2005, the disclosure of which is incorporated by reference herein.

BACKGROUND

Many different types of applications are able to interact with the Internet and acquire data or other information from the Internet. For example, some applications can allow a user to download certain content, such as web pages, files and the like. With the ability to interact with the Internet come various risks that are associated with such interaction.

For example, through various interactions that can take place between an application and the Internet, so called malware or spyware can get downloaded on the user's system and can adversely impact the system's performance and, perhaps more importantly, can impermissibly install malicious software. For example, buffer overruns and other security holes can allow malware to maliciously make its way onto a user's system.

With regard to impacting the system's performance, consider the following. In some instances, malware may attempt to, or may actually change security settings associated with a particular application or the user's system in general, thus rendering it more likely for malicious tampering to take place.

Against the backdrop of these and other security concerns remains the ever-present desire, on the part of those who develop software, to provide the user with a safe and rich experience.

SUMMARY

In various embodiments, applications that are configured to interact with the Internet, in some way, are executed in a restricted process with a reduced privilege level that can prohibit the application from accessing portions of an associated computing device. For example, in some embodiments, the restricted process can prohibit applications from read and write access to portions of a system's computer-readable media, such as the hard disk, that contains administrative data and settings information and user data and settings. In these embodiments, a special portion of the disk, termed a "containment zone", is designated and used by applications in this restricted process. The application has full access to the "containment zone" and the "containment zone" is treated as untrusted data by the rest of the system and applications on the system.

In other embodiments, the application will need access to areas outside of the "containment zone", and a broker mechanism is utilized and is logically is interposed between the application and areas outside of the containment zone (i.e. the restricted area) of the computing system. The broker mechanism acts to broker access to the restricted area and to ensure that the user is aware of and can approve the application's access to the restricted areas of the computing system. Explicit user interaction is needed in order to gain access to the restricted area. Such access cannot be automated to circumvent the restrictions placed on the application.

In other embodiments, a shim mechanism is employed to redirect access, typically for third party extensions, to the containment zones. This is useful for keeping compatibility with third party extensions if the application is a host application.

In yet other embodiments, an application's execution in the restricted process can result in another application being launched which is functionally similar to the restricted application, yet is less restricted in order to facilitate the user experience in particular contexts which have been deemed as trusted or at least desirably secure.

BRIEF DESCRIPTION OF THE DRAWINGS

FIG. 6 is a block diagram of a client computing device in accordance with one embodiment.

DETAILED DESCRIPTION

Overview

Figure 1:
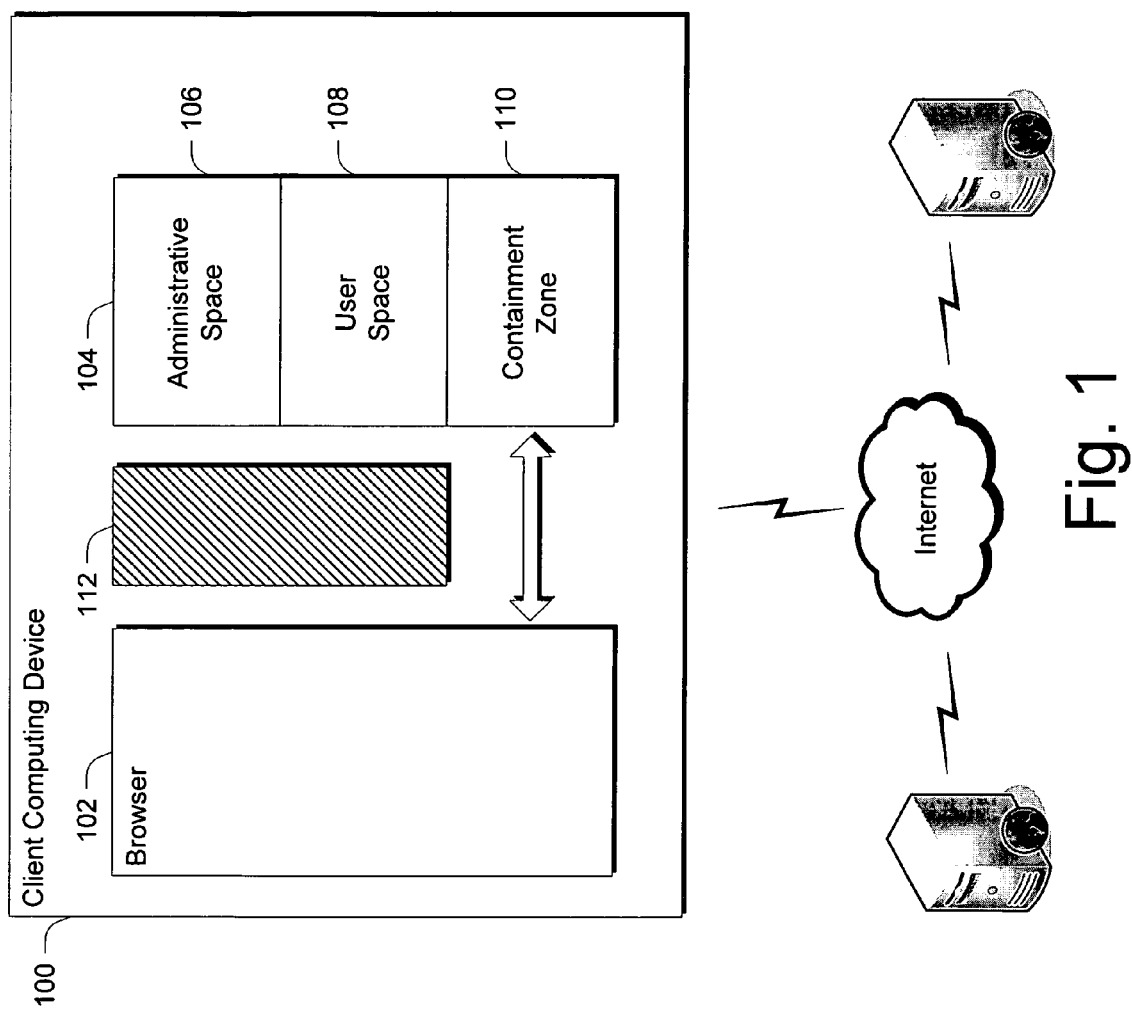
FIG. 1 is a block diagram of a system in accordance with one embodiment.

In various embodiments, applications that are configured to interact with the Internet, in some way, are executed in a restricted process with a reduced privilege level that can prohibit the application from accessing portions of an associated computing device. For example, in some embodiments, the restricted process can prohibit applications from read and write access (or at least write access) to portions of a system's computer-readable media, such as the hard disk, that contains administrative data and settings information and user data and settings. In these embodiments, a special portion of the disk, termed a "containment zone", is designated and used by applications in this restricted process. The application has full access to the "containment zone" and the "containment zone" is treated as untrusted data by the rest of the system and applications on the system.

In other embodiments, the application will need access to areas outside of the "containment zone", and a broker mechanism is utilized and is logically interposed between the application and areas outside of the containment zone (i.e. the restricted area) of the computing system. The broker mechanism acts to broker access to the restricted area and to ensure that the user is aware of and can approve the application's access to the restricted areas of the computing system. In at least some embodiments, explicit user interaction is needed in order to gain access to the restricted area. In these embodiments, such access cannot be automated to circumvent the restrictions placed on the application. In yet other embodiments, silent process elevation can be allowed can controlled by policy, or silent write access can be hardcoded.

In other embodiments, a shim mechanism is employed to redirect access, typically for third party extensions, to the containment zones. This is useful for keeping compatibility with third party extensions if the application is a host application.

In yet other embodiments, an application's execution in the restricted process can result in another application being launched which is functionally similar to the restricted application, yet is less restricted in order to facilitate the user experience in particular contexts which have been deemed as trusted or at least desirably secure.

The techniques described in this document can be employed in connection with any type of application that interacts with the Internet. These types of applications, as will be appreciated by the skilled artisan, are many and varied. However, to provide a tangible context to appreciate the inventive embodiments, an application in the form of a web browser application is utilized. It is to be appreciated and understood, however, that the techniques can be employed with other types of applications without departing from the spirit and scope of the claimed subject matter. By way of example and not limitation, these other types of applications include instant messaging clients, peer-to-peer clients, RSS readers, email clients, word processing clients and the like.

Restricting Internet Applications and Using a Broker

FIG. 1 illustrates a high level view of a system 100 in accordance with one embodiment. In this example, system 100 includes an Internet application in the form of a web browser 102 that can interact with the Internet as shown. System 100 also includes computer-readable media 104, such as a hard disk, that contains different portions or "space" that contain different types of information, settings data and the like.

In this example, one portion or space is the administrative space 106 that includes information and data that is usually accessible to and manipulable by a system administrator. This type of information and data can include information and data that is typically contained in operating system folders, computer system folders, permanent file folders and the like. This space usually requires an administrator with the appropriate credentials and privileges in order for its content to be accessed and manipulated.

Another portion or space is the user space 108 that includes user information and data. This type of information and data can include information and data that is typically contained in user-accessible folders such as My Documents, My Music, Desktop and the like. This space can typically be associated with lesser privileges in order for access to be granted.

In accordance with one embodiment, computer-readable media 104 includes one or more containment zones 110. A containment zone is the only zone which can, in at least some embodiments, be directly written to by browser 102. To facilitate this functionality, a wall or blocking mechanism 112 is provided and prevents browser 102 from directly writing to the administrative space 106 or the user space 108. In at least some embodiments, a containment zone can allow for the settings of the restricted application to be saved between sessions in a place where they could not pollute any other application on the machine. The containment zone might include a few registry locations and files folders. In the context of a web browser application, containment zone 110 can include a Temporary Internet Files folder which is used to improve web page loading time and for caching other types of data.

Thus, in this embodiment, one or more containment zones are specifically defined and designated as those portions of the computing device to which an Internet application, such as a web browser application, can have access. This is different from an approach which simply denies access to portions of a disk and permits access to other portions based on the particular user who might be attempting such access. Rather, in the inventive type of approach, the restriction is application-centric and not necessarily user-centric. That is, the inventive approach can be considered as user-independent. This approach helps to ensure that only a small number, e.g. a minimum number of required locations, are exposed in the containment zone and helps to ensure that other applications do not store settings in the containment zone. In addition, this application-centric approach can make both the administrative and the user space inaccessible to the application.

Hence, at this point, wall or blocking mechanism 112 is logically interposed between browser 102 and certain predefined spaces, such as the administrative 106 and user spaces 108, to prevent the browser from directly accessing such spaces. Yet, in some instances, it can be desirable to allow an application to access the administrative or user space. For example, the user who is a system administrator may wish to legitimately manipulate some system settings. Alternately, a regular user may wish to save a picture to the My Document folder.

In this embodiment, a broker mechanism is utilized and is logically interposed between the application, in this case browser 102, and the restricted area of the computing system. The broker mechanism acts to broker access to these restricted areas and to ensure that the user is aware of and can approve the application's access to these restricted areas of the computing system.

Figure 2:
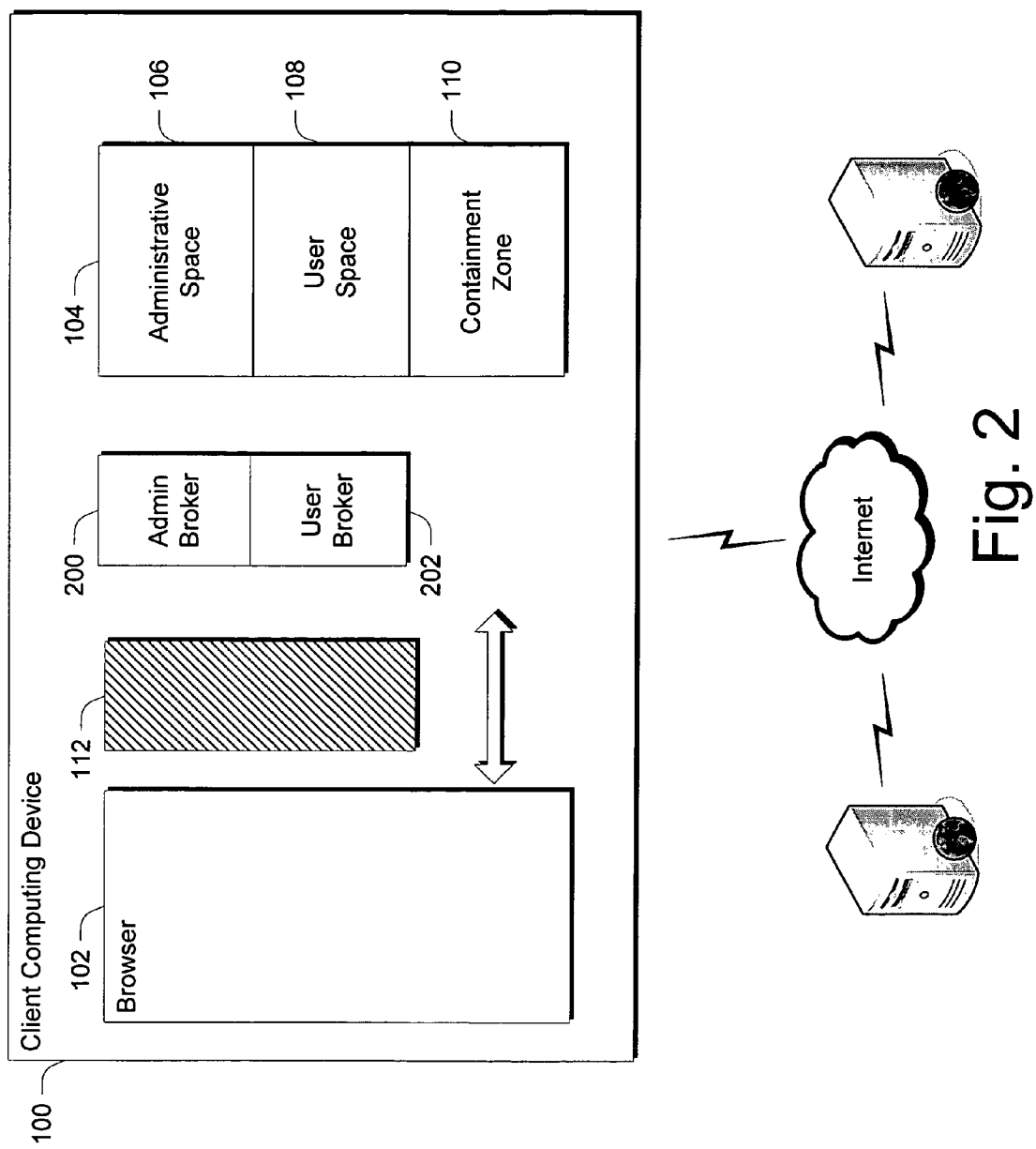
FIG. 2 is a block diagram of a system in accordance with one embodiment.

As an example, consider FIG. 2, wherein like numerals from the FIG. 1 embodiment have been utilized. There, a broker mechanism is provided in the form of broker objects 200, 202. In this example, broker object 200 is an administrative space broker object and brokers access to the administrative space 106. Broker object 202, on the other hand, is a user space broker object and brokers access to the user space. The broker mechanism can be implemented in any suitable way using any suitable type of object. In one implementation, each broker object is implemented as a DCOM local server object. In addition, broker objects run in a separate process from browser 102, which provides a degree of protection from attacks by malicious code that target browser 102. In addition, in at least one implementation, the broker objects are task based and have their lifetimes defined by the tasks that they are to accomplish.

In this example, when an application such as browser 102 wishes to access a particular restricted space, such as the administrative or user space, the application calls the associated broker object which then inspects the application's request. The broker object can inspect the request for a number of reasons among which include ensuring that it is a well-formed request or checking for an electronic signature on the files being downloaded by the application. Once the request is inspected, the broker object can take steps to broker access to the restricted space. This is not only useful for the application itself, but for third party extensions that run inside the application's process. For example, in the context of browser 102, a typical third party extension that might run inside the browser process is a tool bar, such as the Google tool bar. Sometimes, these third party extensions may wish to access the restricted space of the computing device. In these situations, the broker object can broker access for these third party extensions to the restricted space of interest.

In addition, there may be third party extensions that do not necessarily run inside the browser process. For these extensions, the broker objects can be used as well. For example, if the user is on a Sharepoint site, they might navigate to a Word or PDF document that actually gets displayed inside the browser. Yet, the associated extension that is responsible for getting this document for the user does not run inside the browser's process. In this situation, the broker objects can be used to broker access to the restricted space of interest.

In some embodiments, brokering access to restricted space can include prompting the user to ascertain whether the user wishes to access the space in the manner represented in the request. For example, if the user is attempting to save a picture to their My Documents folder, the broker object may simply ask the user, through an appropriate dialog box, if this is the user's intent. If confirmed, then the broker object can permit and facilitate the access. Alternately or additionally, if the user is the administrator and is attempting to write to the administrative space, then the broker object may request the administrator to enter their credentials. In this manner, access to the restricted space is maintained. In these examples, the broker objects perform the writing or modify the restricted space so as to abstract that process away from the application that is calling.

In addition, the broker objects can further increase security by forcing certain tasks to be called in sequence and by caching various parameters associated with the sequenced calls. As an example, consider the following. In some instances, malicious code may attempt to automatically save a file to a location in the restricted space of the computing device. More specifically, this malicious code may simply call a "Save" API and attempt to save the file. In this embodiment, however, a sequence of calls at least some of which require the user's intervention can be utilized to protect against this scenario. More specifically, in accordance with one embodiment, a first call can be made to the broker object in which the user provides the name of the file and the location to which the file is to be saved. This information is then cached in the broker object in a manner in which it cannot be tampered with. Subsequently, a second call by the application can be made to save the file. In this second call, parameters are provided which can include the name of the file and the location to which the file is to be saved. The broker object can then check the cached parameters against the parameters received in the second call and if they match, permit the file to be saved in the appropriate location. If, on the other hand, the parameters do not match, the file will not be saved in the specified location. In this embodiment, the dialog that takes place with the user can be hosted in the broker to ensure even more security.

Thus, wall or blocking mechanism 112 and the broker mechanism 200, 202 collectively work to block access to restricted areas of the disk, yet not inhibit access to those portions in appropriate circumstances.

Having explored the notion of the wall or blocking mechanism, as well as the broker mechanism, the discussion that follows just below provides but one example (along with an alternative example) of how the blocking mechanism can be implemented. It is to be appreciated and understood that the blocking mechanism and broker mechanism can be implemented in other ways without departing from the spirit and scope of the claimed subject matter.

Blocking Mechanism—Implementation Example

In the discussion that follows, a blocking mechanism is described in the context of a tokenized system that imposes low rights on an Internet application. The imposition of low rights, in turn, causes certain portions of the client system, such as the administrative and user spaces, to be restricted from the application. In a first embodiment, a token which is not necessarily structured to inherently permit this type of applicant-centric functionality is processed and reconfigured to implement this functionality. In a second embodiment, a token is structured, through what are referred to as "integrity levels", to permit the application-centric functionality described above.

First Embodiment—Reconfiguring a Token

In many systems, when a user runs or executes an application, the application executes in the user's context. What this means is that the user typically has user data, such as a user name and user privileges, that circumscribe the execution of the application. More specifically, the user name and privileges can be represented by and in the context of a token. Thus, when a user executes an application, the application becomes aware of and inherits aspects of the user's context, such as the user's privileges, via the token. Accordingly, if the user is the system administrator, then an associated token would identify the user as such, and the application would inherit the system administrator's privileges which, in turn, would allow the application to write to the administrative space mentioned above.

Figure 3:
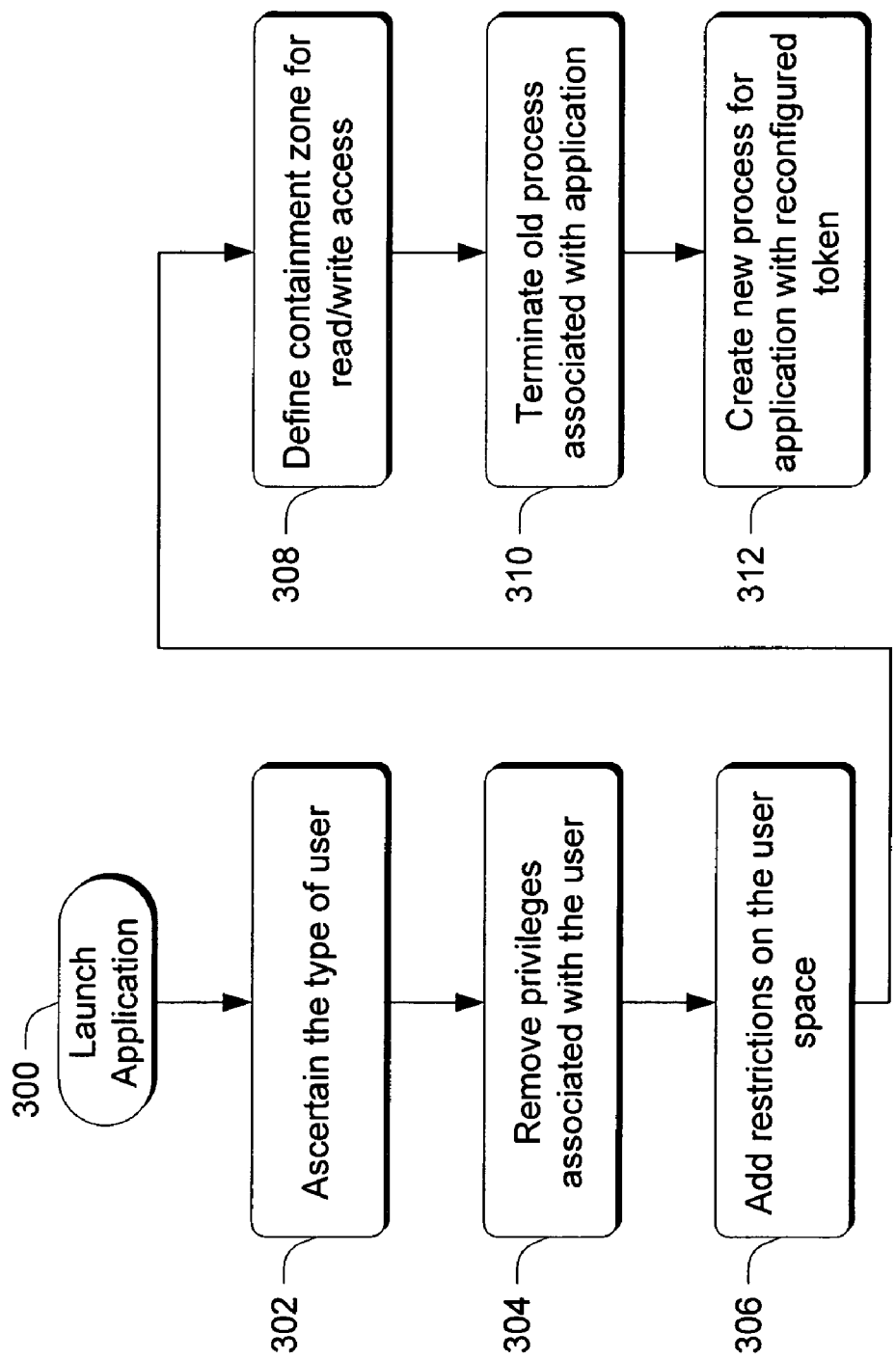
FIG. 3 is a flow diagram that describes steps in a method in accordance with one embodiment.

FIG. 3 is a flow diagram that describes steps in a token processing method in accordance with one embodiment. The method can be implemented in connection with any suitable hardware, software, firmware or combination thereof. In one embodiment, aspects of the method are implemented by a suitably configured application, such as browser application 102 in FIGS. 1 and 2.

Step 300 launches an application which, in the present example, is a web browser such as the browser illustrated and described above. When the user launches the application, a token associated with the user becomes available to the application from which, as noted above, the application can inherit the user's privileges.

Step 302 ascertains the type of user. There can be different types of users such as an administrative user, a power user, a backup operator and the like. Step 304 removes privileges associated with the type of user. In the illustrated embodiment, this step is implemented by effectively manipulating the token's data to remove designations that indicate any privileges associated with the token and hence, the user type. This step essentially creates a block to the administrative space of the computing device, such as administrative space 106 in FIGS. 1 and 2.

Step 306 adds restrictions on the user space. In the illustrated and described embodiment, this is done by effectively manipulating the token's data to remove the user's name from the token. By removing the user's name from the token, the privileges that are associated with that particular user are removed as well.

Step 308 then defines one or more containment zones for read/write access. In this particular example, this step is implemented by replacing the removed user name with a particular defined user group name, for example, "IEUsers-Group". Now, for the one or more containment zones, these zones are the only zones designated for read/write access for members of the particular defined group name.

Thus, at this point, any administrative privileges have been removed thus effectively blocking the administrative space. Likewise, the user's privileges have been removed, thus blocking access to the user space. However, by changing the user's name to a particular group name and associating that group name with the containment zone(s), read/write access for the application can now be limited only to the containment zone(s).

More specifically, having proceeded as described above, step 310 terminates the old process associated with the application that was launched, and step 312 creates a new process for the application with the reconfigured token.

Using this reconfigured token, the application will not be able to directly access either the administrative space or the user space. Rather, the application will only be able to directly write to the containment zone and, without further intervention by, for example, a broker mechanism, the application will be unable to cause data to be written to the user or administrative space.

Second Embodiment—Using Integrity Levels

In another embodiment, a token is utilized and is structured, through what are referred to as "integrity levels", to permit the application-centric functionality described above. That is, through a process referred to as Mandatory Integrity Control, the token that is associated with a user has different integrity levels such as "high", "medium" and "low" that can be set. Likewise, computing resources on the client device have associated integrity levels and in order to access resources, the resource must have the same integrity level or one that is lower than the user's integrity level.

So, for example, by establishing the integrity levels of the administrative and user spaces as "high" and "medium" respectively, and that of the user as "low", access to the administrative and user spaces is effectively blocked. However, designating a containment zone as having a "low" level of integrity allows a user to access that containment zone through whatever application the user happens to be using.

The notion of integrity levels can also be applied to message sending processes that occur between and amongst applications to further enhance the security of the overall system. As an example, consider the following. Applications can communicate with one another using messages. One type of messaging system is the Window Messaging System, which will be understood and appreciated by those of skill in the art. The messaging that takes place between applications typically takes place using a set of APIs through which the applications can call and send messages to one another.

Messaging can allow for a couple of different conditions that can potentially present security risks. First, through messaging an application may attempt to automate another application's or code's behavior. For example, one application might be a credential user interface in which a user is to provide their name and password for authentication. Yet, through the messaging dynamic, another application might be able to automate this behavior such that the user need not physically enter their credentials. If this occurs, then it may be possible for an application that has a lower integrity level to manipulate an application that has a higher integrity level which, in turn, presents a security risk. Second, often times an application will have cause to start another application or cause objects to be instantiated for any number of reasons. If, in this scenario, a lower integrity application is allowed to start a higher integrity application, it may be possible for the lower integrity application to perform tasks that it should be restricted from performing.

In accordance with one embodiment, whenever an application attempts to use a messaging system to communicate with another application, a component in the messaging system checks the source's integrity level (i.e. the originator of the message) and the target's integrity level (i.e. the intended recipient of the message). If the integrity levels are equal or the integrity level of the target is lower than that of the source, then the message is allowed. If the integrity level of the target is higher than the integrity level of the source, then the message is blocked.

More generally however, whenever an application attempts to perform an action that is associated with an integrity level, if the attempted action pertains to an integrity level that is the same as or lower than the application attempting the action, then the action is allowed. Otherwise, the action is blocked.

Using a Shim

Figure 4:
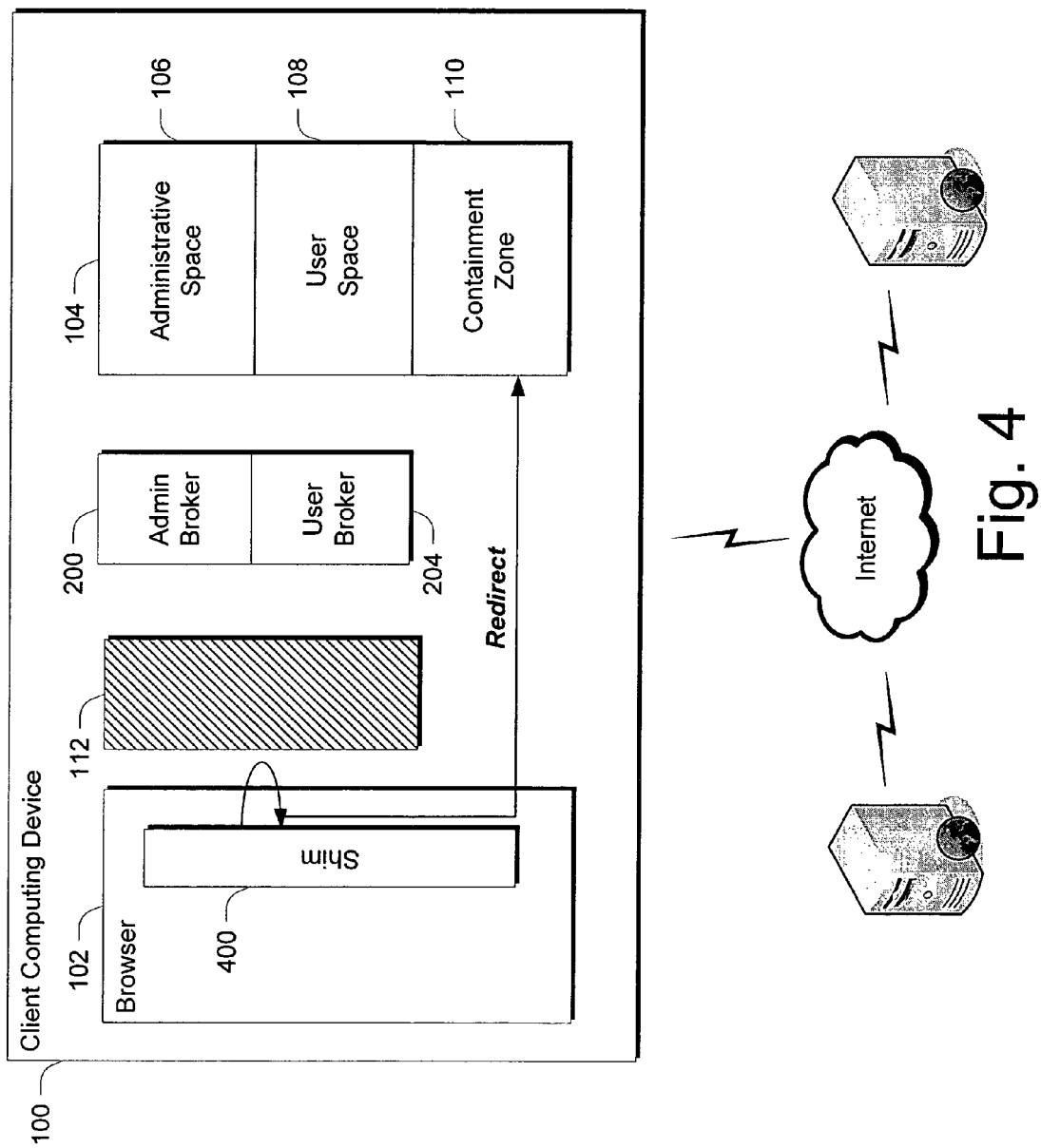
FIG. 4 is a block diagram of a system in accordance with one embodiment.

In at least some embodiments, a shim mechanism, such as shim 400 in FIG. 4, is utilized to redirect access, typically for third party extensions, to the containment zones or so-called virtualized locations. More specifically, in the context of the browser application, many different third party extensions can be provided and run in conjunction with or inside of the browser. For example, the Google toolbar is one example of an extension that is designed to run inside of a browser.

Certain extensions typically require write access to sections of a file system and/or registry in order to operate correctly. For example, the Google tool bar may wish to save a list of favorite searches for a particular user. Yet, without access to the user space, this type of write would be blocked by the wall or blocking mechanism 112.

In accordance with one embodiment, when application 102 or an associated third party component attempts to write to a restricted space, shim 400 is configured to trap and redirect the call and write the data into a containment zone or virtualized location. Subsequent calls by the application for the data that was redirected to the containment zone are handled by the shim and the appropriate data is retrieved from the containment zone. Hence, data that was intended to be written to the administrative or user space by a particular extension or application is redirected into an appropriate containment zone. In some embodiments, there can be no redirection for write access when it pertains to an administrative space.

In at least some embodiments, data that is attempted to be written such as settings and configuration data by the application is not shimmed. Rather, in these embodiments, only components or code that are not a recognized part of the basic application are shimmed. For example, a browser typically ships with a collection of DLLs and other code that implements the basic browser. These DLLs and other code would be considered as a part of the basic application for purposes of determining whether shimming should take place. Any third party extensions that are added to the browser would be shimmed. By doing this, these embodiments avoid a situation in which an exploited vulnerability can change the virtualized settings and trick the host application into reading those new settings. If these were security settings, this could be used to perform an elevation of privilege attack on the application. Accordingly, by shimming third party extensions, the chances of an elevation of privilege attack are greatly reduced.

This allows third party extensions to continue to operate without requiring any third party code to be rewritten. In operation, the third party extension believes it is writing data to the user or administrative space. Yet, through the mechanism of the shim, such data is getting written to and read from the containment zone.

Launching an Application that is Not Restricted

As noted above, in some embodiments, an application's execution in the restricted process can result in another application being launched which is functionally similar to the restricted application, yet is less restricted in order to facilitate the user experience in particular contexts which have been deemed as trusted or at least desirably secure.

As a more tangible example, consider the following in the browser context. Assume that a corporate user has access through their client computing device to both the Internet and a company intranet. Assume also that the company intranet is a secure and trusted entity. Further assume that the user's computing device is executing several different business applications that need a high degree of compatibility to keep running properly. In context such as these, as well as others, it can be desirable to allow the application to operate in an unrestricted manner when executing in the context of the company's intranet—that is, in a manner that is unrestricted by blocking mechanism 112.

Figure 5:
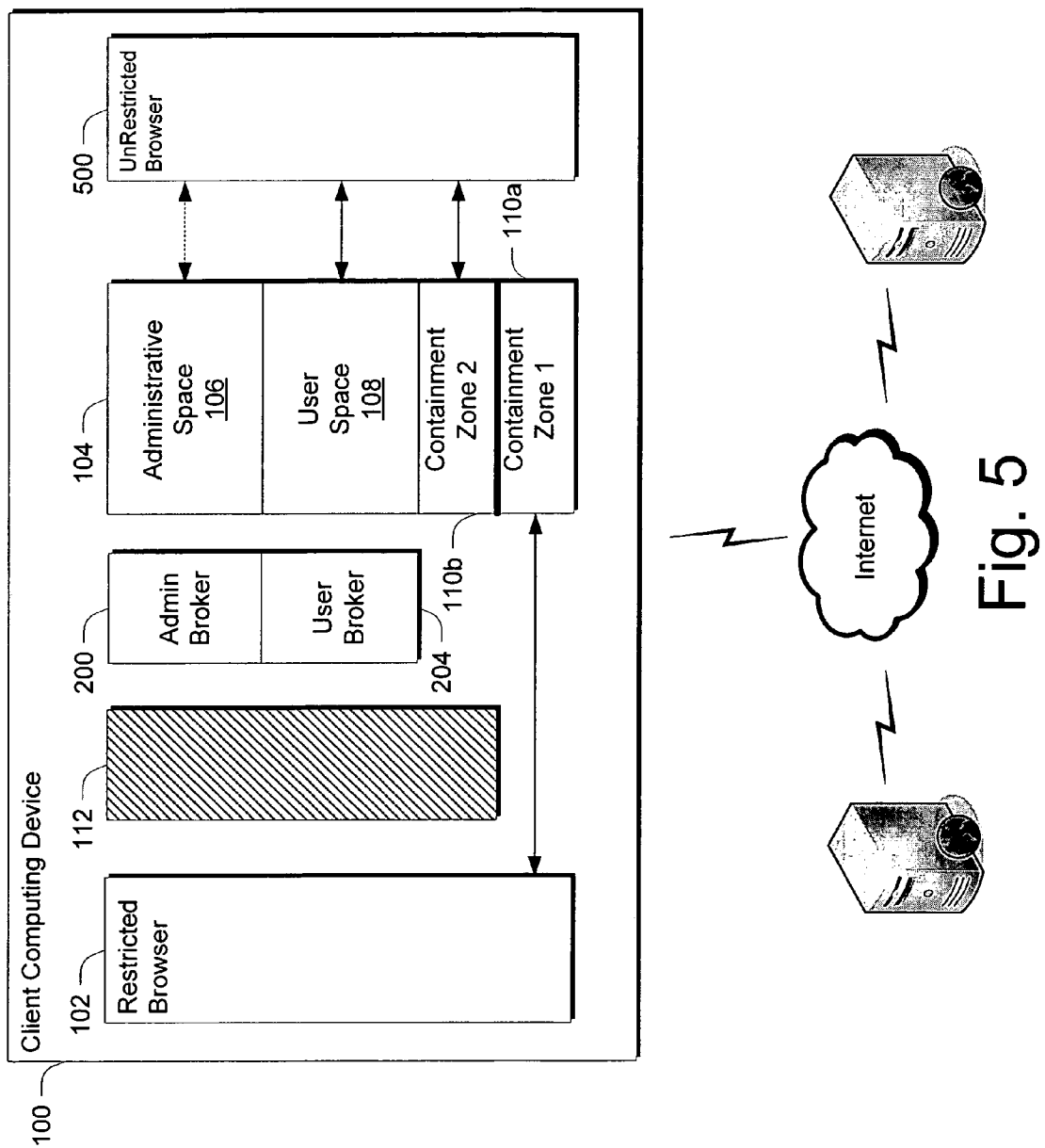
FIG. 5 is a block diagram of a system in accordance with one embodiment.

As an example, consider FIG. 5 in connection with the following. There are certain contexts that an application may attempt to execute in, and these contexts can pertain to a particular zone that has been defined as being trusted or may otherwise carry with it a level of security that has been defined as "safe". In the browser example, the user may attempt to navigate to a corporate intranet or some other safe zone. In this case, restricted browser 102 calls the broker mechanism and the broker mechanism, based on the call that the application is making, can instantiate an unrestricted browser 500 with which the user can operate in the particular zone to which they have navigated. In this example, a token is created and configured to include the privileges associated with the user (such as administrative privileges, power user privileges and the like), as well as a user name associated with the user to provide the user with access to the appropriate portion of the user space. This is also useful when launching third party applications that my not be capable of running restricted.

In addition, in this embodiment, the containment zone is defined in a manner that maintains a separation between the restricted and unrestricted browsers 102, 500 respectively. Specifically, recall from the discussion above that a containment zone in the form of a Temporary Internet File folder is provided into which the restricted browser 102 and other components read and write. Yet, in the present embodiment, if the unrestricted browser 500 were to use this containment zone for writing and reading temporary Internet files, there is a chance that an exploited restricted browser could access write data that would be read by the unrestricted browser 500 and executed at a higher privilege level, which would create an elevation of privilege attack.

Accordingly, to address this situation, as well as others, different containment zones are defined, one of which being associated with the restricted browser 102, the other of which being associated with the unrestricted browser 500 and isolated from the restricted browser. In the illustrated example, containment zone 110a is associated with and useable only by restricted browser 102. Likewise, containment zone 110b is associated with and useable only by unrestricted browser 500. Neither browser can read or write to or from the other's associated containment zone. As such, wall 112 is seen to extend down and block access from the restricted browser 102 to containment zone 110b.

In the implementation above in which the token is processed and reconfigured, containment zone 110a is designated as being able to be read from and written to only by the group identified in the token. Hence, applications executing in the context of this token cannot access containment zone 110b.

Exemplary Use Scenarios

The following use scenarios provide some additional examples of how the above-described inventive embodiments can be utilized in the context of a web browser.

Consider first an example in which the inventive embodiments can be utilized to protect the user. Assume that user Abby visits a website that exploits a buffer overrun in the browser to install a control. Here, Abby navigates to a page that uses a buffer overrun exploit in the browser to inject native code into the process space. The native code downloads a dynamic link library (DLL) into a folder on her machine and attempts to register as an ActiveX control to be loaded by the browser by creating entries in the registry. Here, however, the operation fails because the browser does not have permission to write to the registry. Abby then receives a notification and continues to browse securely.

As another example, assume that user Abby visits a website that uses a control she has installed to attempt to overwrite a system file. Here, Abby navigates to a page that contains an already installed ActiveX control. The control attempts to overwrite a DLL in her system folder. Here, however, the operation is rejected and Abby receives a notification informing her that the page attempted to perform a privileged operation. She then continues to browse securely.

Consider now an example in which the inventive embodiments can be utilized to maintain the compatibility of Abby's system. Here, assume that Abby upgrades her video drivers from a website. Abby navigates to the web site and clicks on the link to the driver.exe file. The file is downloaded and the executable install broker (i.e. the broker mechanism) prompts Abby to ensure she trusts the executable and wishes to install it. If approved by Abby, the installation completes successfully and Abby continues to browse securely.

Assume now that Abby visits her favorite web site. A new menu control has been added, so the browser needs to install the control. Abby is prompted to ask if she trusts the control, and to authorize the installation. If approved, the control installs and Abby continues navigating the site and browsing securely.

Exemplary Computing System

FIG. 6 shows an exemplary computer system having components that can be used to implement one or more of the embodiments described above.

Computer system 630 includes one or more processors or processing units 632, a system memory 634, and a bus 636 that couples various system components including the system memory 634 to processors 632. The bus 636 represents one or more of any of several types of bus structures, including a memory bus or memory controller, a peripheral bus, an accelerated graphics port, and a processor or local bus using any of a variety of bus architectures. The system memory 634 includes read only memory (ROM) 638 and random access memory (RAM) 640. A basic input/output system (BIOS) 642, containing the basic routines that help to transfer information between elements within computer 630, such as during start-up, is stored in ROM 638.

Computer 630 further includes a hard disk drive 644 for reading from and writing to a hard disk (not shown), a magnetic disk drive 646 for reading from and writing to a removable magnetic disk 648, and an optical disk drive 650 for reading from or writing to a removable optical disk 652 such as a CD ROM or other optical media. The hard disk drive 644, magnetic disk drive 646, and optical disk drive 650 are connected to the bus 636 by an SCSI interface 654 or some other appropriate interface. The drives and their associated computer-readable media provide nonvolatile storage of computer-readable instructions, data structures, program modules and other data for computer 630. Although the exemplary environment described herein employs a hard disk, a removable magnetic disk 648 and a removable optical disk 652, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 644, magnetic disk 648, optical disk 652, ROM 638, or RAM 640, including an operating system 658, one or more application programs 660, other program modules 662, and program data 664. A user may enter commands and information into computer 630 through input devices such as a keyboard 666 and a pointing device 668. Other input devices (not shown) may include a microphone, joystick, game pad, satellite dish, scanner, or the like. These and other input devices are connected to the processing unit 632 through an interface 670 that is coupled to the bus 636. A monitor 672 or other type of display device is also connected to the bus 636 via an interface, such as a video adapter 674. In addition to the monitor, personal computers typically include other peripheral output devices (not shown) such as speakers and printers.

Computer 630 commonly operates in a networked environment using logical connections to one or more remote computers, such as a remote computer 676. The remote computer 676 may be another personal computer, a server, a router, a network PC, a peer device or other common network node, and typically includes many or all of the elements described above relative to computer 630, although only a memory storage device 678 has been illustrated in FIG. 6. The logical connections depicted in FIG. 6 include a local area network (LAN) 680 and a wide area network (WAN) 682. Such networking environments are commonplace in offices, enterprise-wide computer networks, intranets, and the Internet.

When used in a LAN networking environment, computer 630 is connected to the local network 680 through a network interface or adapter 684. When used in a WAN networking environment, computer 630 typically includes a modem 686 or other means for establishing communications over the wide area network 682, such as the Internet. The modem 686, which may be internal or external, is connected to the bus 636 via a serial port interface 656. In a networked environment, program modules depicted relative to the personal computer 630, or portions thereof, may be stored in the remote memory storage device. It will be appreciated that the network connections shown are exemplary and other means of establishing a communications link between the computers may be used.

Generally, the data processors of computer 630 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The embodiments described above can reduce the security risks associated with applications that have access to the Internet, while at the same provide users with safe, rich experiences.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
blocking, with a blocking mechanism, Internet-application access to administrative and/or user spaces of a client computing device on which the Internet-application executes;
defining at least one containment zone in which said Internet-application is to write and read data;
providing an administrative broker object that is configured to broker access to the administrative space that is blocked, and a user broker object that is configured to broker access to the user space that is blocked, wherein the administrative broker object and the user broker object are task-based, at least one of the administrative broker object or the user broker object having a lifetime defined by a task;
executing at least the administrative broker object or the user broker object in a separate process than the Internet-application;
inspecting a request from the Internet-application to access at least one of said administrative space or said user space by confirming that the request is valid and by checking an electronic signature of the Internet-application, the request to access said administrative space being inspected by the administrative broker object and the request to access said user space being inspected by the user broker object;
modifying at least one of said administrative space with the administrative broker object or said user space with the user broker object for said Internet-application in response to receiving a confirmation of credentials;
brokering access to at least one of said administrative space with the administrative broker object or said user space with the user broker object for said Internet-application by forcing certain tasks to be called in a defined order to accomplish a desired action, the defined order of calls comprising parameters that are cached in the administrative broker object or the user broker object and later compared with subsequently received parameters, wherein access is brokered only for matching parameters; and
if compared parameters do not match, maintaining blocked access to said administrative and/or user spaces for said Internet-application.

2. The method of claim 1 further comprising brokering access to said administrative and/or user spaces for other third party extensions associated with the Internet-application.

3. The method of claim 1 further comprising brokering access to said administrative and/or user spaces for other third party extensions associated with the Internet-application, wherein said act of brokering comprises prompting a user to ascertain whether the user wishes to access said defined spaces.

4. The method of claim 1 further comprising brokering access to said administrative and/or user spaces for other third party extensions associated with the Internet-application, wherein said third party extensions execute in the Internet-application's process.

5. The method of claim 1, wherein said act of brokering comprises prompting the user to ascertain whether the user wishes to access said defined spaces.

6. The method of claim 1, wherein said desired action comprises saving data.

7. The method of claim 1, wherein at least one call requires a user's interaction.

8. A computer-implemented method comprising:
blocking, with a blocking mechanism, Internet-application access to administrative and/or user spaces of a client computing device on which the Internet-application executes;
defining at least one containment zone in which said Internet-application is to write and read data;

providing an administrative broker object that is configured to broker access to the administrative space that is blocked, and a user broker object that is configured to broker access to the user space that is blocked;

executing at least the administrative broker object or the user broker object in a separate process than the Internet-application;

inspecting a request from the Internet-application to access the blocked administrative space and/or blocked user space by checking an electronic signature of the Internet-application and by confirming that the request is valid, the inspecting being performed by the administrative broker object and/or a user broker object;

modifying said administrative space with the administrative broker object or said user space with the user broker object for said Internet-application in response to receiving a confirmation of credentials;

brokering access to the blocked administrative space with the administrative broker object at least by modifying the blocked administrative space with the administrative broker object;

brokering access to the blocked user space with the user broker object, at least in part, by modifying the blocked user space with the user broker object, wherein the user broker object and the administrative broker object are configured to be task-based, at least one of the administrative broker object or the user broker object having a lifetime defined by a task;

shimming data that is attempted to be written to said administrative and/or user spaces by entities other than the Internet-application;

shimming data that is attempted to be written to said administrative and/or user spaces by said Internet-application, wherein such data only comprises data not recognized as a basic part of the Internet-application; and retrieving shimmed data from the containment zone in response to calls by the Internet-application for the shimmed data.

9. The method of claim 8, wherein said Internet-application comprises a browser.

10. The method of claim 8, wherein said Internet-application comprises a browser, and wherein said entities comprise third party extensions to the browser.

* * * * *